United States Patent
Yu et al.

(10) Patent No.: US 9,429,142 B2
(45) Date of Patent: Aug. 30, 2016

(54) METHOD FOR CHARGING A DC LINK OF A WIND TURBINE POWER ELECTRONIC CONVERTER

(71) Applicant: VESTAS WIND SYSTEMS A/S, Aarhus N (DK)

(72) Inventors: Weifu Yu, Singapore (SG); Anshuman Tripathi, Singapore (SG); Ravi Kandasamy, Singapore (SG)

(73) Assignee: Vestas Wind Systems AS, Aarhus N (DK)

( * ) Notice: Subject to any disclaimer, the term of this patent is extended or adjusted under 35 U.S.C. 154(b) by 0 days.

(21) Appl. No.: 14/525,614

(22) Filed: Oct. 28, 2014

(65) Prior Publication Data
US 2015/0124496 A1 May 7, 2015

(30) Foreign Application Priority Data
Nov. 6, 2013 (DK) .................. 2013 70646

(51) Int. Cl.
*H02P 9/04* (2006.01)
*F03D 9/00* (2016.01)
(Continued)

(52) U.S. Cl.
CPC ............ *F03D 9/003* (2013.01); *F03D 7/026* (2013.01); *F03D 7/0224* (2013.01); *H02J 3/36* (2013.01); *H02M 1/36* (2013.01); *H02M 7/125* (2013.01);
(Continued)

(58) Field of Classification Search
CPC ...... F03D 7/0224; F03D 7/026; F03D 9/003; H02J 3/36; H02J 3/386; H02M 1/36; H02M 5/4585; H02P 9/04; H02P 9/08
See application file for complete search history.

(56) References Cited

U.S. PATENT DOCUMENTS 6,128,204 A 10/2000 Munro et al.
7,015,595 B2 * 3/2006 Feddersen ............ F03D 7/0224
290/44
(Continued)

FOREIGN PATENT DOCUMENTS

EP 1909371 A2 4/2008
EP 2017953 A2 1/2009
WO 2013/007268 A2 1/2013

OTHER PUBLICATIONS

Danish Search Report for PA 2013 70646, Jun. 20, 2014.
(Continued)

*Primary Examiner* — Tulsidas C Patel
*Assistant Examiner* — S. Mikailoff
(74) *Attorney, Agent, or Firm* — Patterson + Sheridan LLP

(57) ABSTRACT

The present invention relates to a method for charging a DC link of a power converter included in a wind turbine generator, the wind turbine generator comprising a generator side converter connected to an electrical generator and a grid side converter connectable, or connected, to an electrical grid through a grid circuit breaker, and a converter controller arranged to control at least the DC link, the DC link having a DC voltage level, the wind turbine generator comprising a wind turbine rotor arranged to rotate the electrical generator, wherein the method comprises rotating the wind turbine rotor whereby the electrical generator generates electrical power, rectifying the electrical power through at least one diode of the generator side converter in order to pre-charge the DC link to a DC voltage level, closing the grid circuit breaker when the DC voltage level is greater than a threshold level. The invention also relates to a wind turbine generator with a converter controller for controlling pre-charging of a DC link.

18 Claims, 6 Drawing Sheets

(51) Int. Cl.
  *F03D 7/02* (2006.01)
  *H02P 9/08* (2006.01)
  *H02J 3/36* (2006.01)
  *H02M 1/36* (2007.01)
  *H02M 7/12* (2006.01)
  *H02M 5/458* (2006.01)
  *H02J 3/38* (2006.01)

(52) U.S. Cl.
  CPC . *H02P 9/04* (2013.01); *H02P 9/08* (2013.01); *H02J 3/386* (2013.01); *H02M 5/4585* (2013.01); *Y02E 10/723* (2013.01); *Y02E 10/763* (2013.01)

(56) References Cited

U.S. PATENT DOCUMENTS

| | | |
|---|---|---|
| 2007/0057516 A1 | 3/2007 | Mever et al. |
| 2007/0073445 A1 | 3/2007 | Llorente Gonzalez et al. |
| 2008/0136185 A1 | 6/2008 | Edenfeld |
| 2009/0146500 A1* | 6/2009 | Jones ............... H02M 5/4585 307/82 |
| 2009/0206606 A1* | 8/2009 | Jorgensen ........... F03D 7/0224 290/44 |
| 2011/0106470 A1* | 5/2011 | Yin .................... H02M 1/12 702/58 |
| 2012/0126628 A1 | 5/2012 | Bjerknes |
| 2013/0033268 A1* | 2/2013 | Parkhou ............... F03D 11/00 324/511 |
| 2013/0119763 A1 | 5/2013 | Zhu et al. |
| 2013/0313826 A1* | 11/2013 | Gupta ................ H02H 7/065 290/44 |
| 2014/0175796 A1* | 6/2014 | Rasmussen .......... F03D 7/028 290/44 |

OTHER PUBLICATIONS

Roberto Galindo Del Valle et al.: "On the Emulation of an Isolated Wind Energy Conversion System: Experimental Results", Electronics, Robotics and Automotive Mechanics Conference, 2009, Cerma '09, IEEE, Piscataway, NJ, Sep. 22, 2009, pp. 462-467.
European Search Report for EP 14389502, Mar. 20, 2015.

* cited by examiner

METHOD FOR CHARGING A DC LINK OF A WIND TURBINE POWER ELECTRONIC CONVERTER

FIELD OF THE INVENTION

The present invention relates to a method for charging a DC link wind turbine power electronic converter connected to a generator. The invention further relates a wind turbine generator with a DC link.

BACKGROUND

With increasing penetration of wind power generation, the requirements for the connection of Wind Power Plants (WPP) to the electrical grid are defined by new and emerging grid connection codes. I order to full fill these grid codes, more and more often modern wind turbine generators are equipped with some sort of a power electronic converter, designed to convert variable frequency electrical power from the generator to fixed frequency power at a connection point in the grid and to provide services that enables the individual wind turbine generator or a plurality of wind turbine generator help reaching the requirements, this type of converter is also known as a variable frequency drive. The type of power electronic converter most often used has some sort of energy storage in the DC link, connecting the generator side of the converter with the grid side of the converter. A requirement for this type a converter to function properly is that the DC link is charged sufficiently prior to operation.

Charging the DC link is known from the prior art, but it requires an additional pre-charge rectifier. Hence, it would be advantageous, and in particular a more efficient and/or reliable if the additional pre-charge rectifier can be omitted. A disadvantage of using the pre-charge rectifier is that when used it causes large in-rush currents, even if the pre-charge rectifier has a current limit, as there will always be a trade-off between in-rush current and time to charge the capacitors in the DC link.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In an aspect, the present invention relates to a method for charging a DC link of a power converter included in a wind turbine generator, the wind turbine generator comprising a generator side converter connected to an electrical generator, a grid side converter connected to an electrical grid through a grid circuit breaker, and a converter controller arranged to control at least the DC link, the DC link having a DC voltage level, the wind turbine generator comprising a wind turbine rotor arranged to rotate the electrical generator,
  wherein the method comprises:
    Rotating the wind turbine rotor whereby the electrical generator generates electrical power,
    rectifying the electrical power through at least one diode of the generator side converter in order to pre-charge the DC link to a DC voltage level,
    closing the grid circuit breaker when the DC voltage level is greater than a threshold level.

An advantage of the first aspect is that the present invention discloses an approach to use the generator side power converter as DC-link voltage pre-charge units. The generator is exploited as an available energy source and the converter helps to get away with the auxiliary charging circuitry. This reduces components in the converter system and thereby enhances reliability.

Another advantage of the first aspect is that the invention uses the same generator control structure as it is implemented today. Further, it causes no current transients as shown in the results attached, as large transient current with uncontrolled DC-link charge process will not occur with this method.

The conventional method according to the prior art utilizes an auxiliary charging circuit to build up DC-link voltage passively without active closed loop control required. While the conventional thinking is straightforward to apply it might not be the best solution.

According to one embodiment of the invention the method further comprises controlling the generator side converter in a boost control mode, when the DC voltage level is greater than a passive rectifier threshold level, to reach a DC voltage level higher than the passive rectifier threshold level. An advantage of this embodiment is that the even a low wind speed where the generator rotates with low RPM, and thus the line to line voltage is low, it is possible to ensure a pre-charge voltage level that is so high that connection to the electrical grid is possible in a safe manner with causing in-rush currents. As besides inrush current, pre-charging of the DC-link capacitor is one of the most important, since too low voltage may cause the control algorithm to fail during start-up.

According to one embodiment of the invention the method comprises controlling the grid side converter, after the grid circuit breaker is closed, so that the DC voltage level is within an operational range. An advantage of this embodiment is that the converter controller changes control strategy such that when the pre-charge of the DC-link is concluded the DC link voltage control is handled by the grid side converter.

According to one embodiment of the invention the method further comprises adjusting the at least one actuator in order to change the blade pitch angle for controlling the generated power. The wind turbine generator may comprise at least one actuator for changing a pitch angle of the blade. An advantage of this embodiment is that during the pre-charge and after the amount of wind power taken by the blade is controlled and thus can the power produced by the generator also be controlled.

According to one embodiment of the invention the method further comprises starting the wind turbine generator after a grid fault. An advantage of this embodiment is that after a fault the electrical grid may be in a state where there is no or very low voltage level at the grid connection point, and thus no power to pre-charge the DC-link. The method of the present invention allows the wind turbine generator to start up in a black start mode.

In a second aspect, the present invention relates to a wind turbine generator comprising a power converter and a wind turbine rotor mechanically connected to an electrical generator, wherein the power converter comprising a generator side converter connected to the electrical generator and a grid side converter connectable, or connected, to an electrical grid through a grid circuit breaker, and a DC link between the generator side converter and the grid side converter, the DC link having a DC voltage level, the wind turbine generator comprising a converter controller arranged to control pre-charging of the DC link by controlling the wind turbine rotor to rotate, whereby power being produced by the generator and rectified through at least one diode of the generator side converter.

According to one embodiment of the invention the electrical generator is a permanent magnet type of generator or a synchronous generator. An advantage of this embodiment is that the permanent magnet generator easily can produce power during low rotational speed, and thus charge the DC-link.

The advantages of the second aspect and its further embodiments are equivalent to the advantages for the first aspect of the present invention.

Thus, the above described object and several other objects are intended to be obtained in a first aspect of the invention by providing a wind turbine generator according to the embodiments described herein.

The individual aspects of the present invention may each be combined with any of the other aspects. These and other aspects of the invention will be apparent from the following description with reference to the described embodiments.

Many of the attendant features will be more readily appreciated as the same become better understood by reference to the following detailed description considered in connection with the accompanying drawings. The preferred features may be combined as appropriate, as would be apparent to a skilled person, and may be combined with any of the aspects of the invention.

BRIEF DESCRIPTION OF THE FIGURES

The figures show one way of implementing the present invention and is not to be construed as being limiting to other possible embodiments falling within the scope of the attached claim set.

FIG. 4 shows the charging sequence and control there in;

DETAILED DESCRIPTION

The present invention will now be explained in further details. While the invention is susceptible to various modifications and alternative forms, specific embodiments have been disclosed by way of examples. It should be understood, however, that the invention is not intended to be limited to the particular forms disclosed. Rather, the invention is to cover all modifications, equivalents, and alternatives falling within the spirit and scope of the invention as defined by the appended claims.

Figure 1:
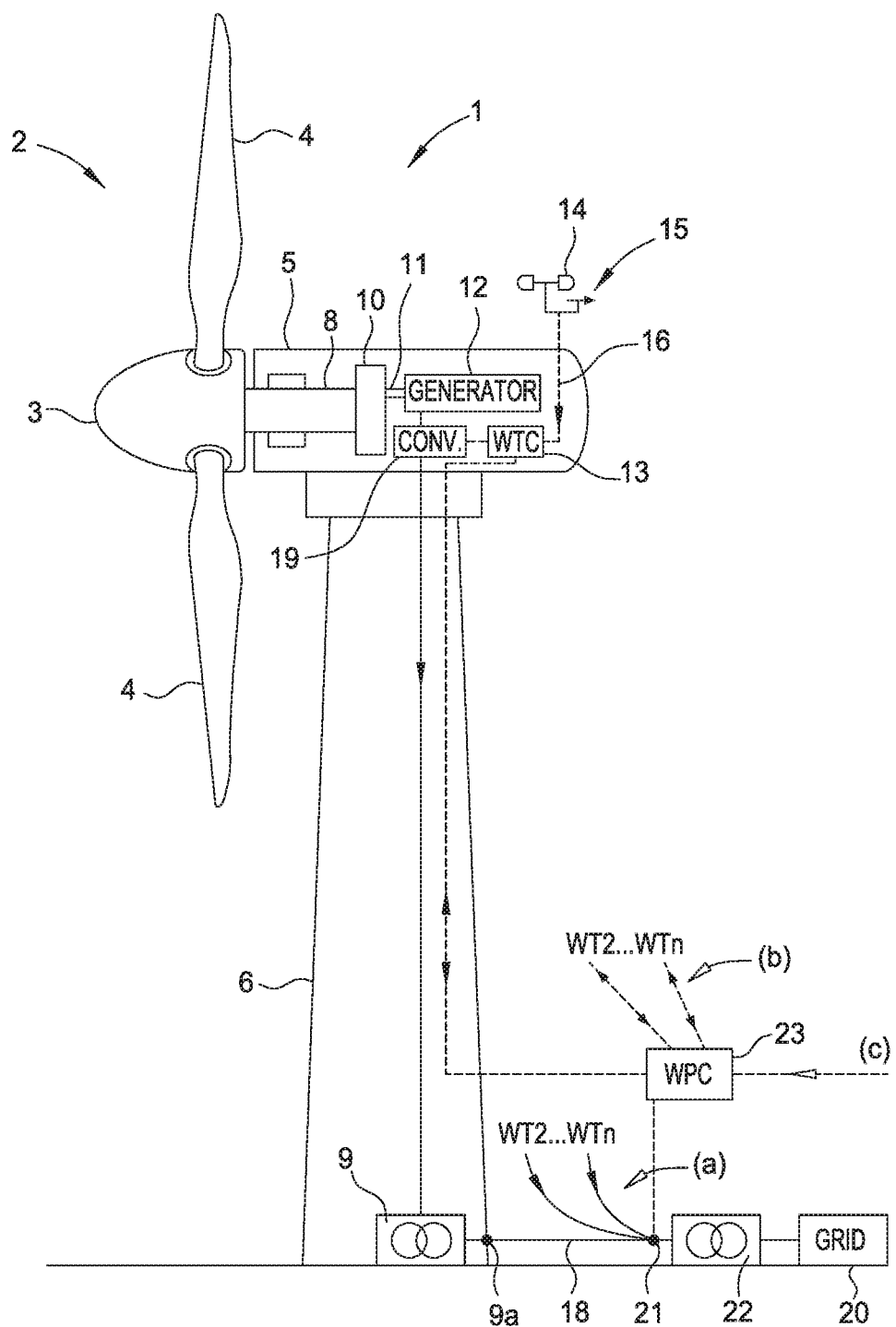
FIG. 1 shows a wind turbine generator according to the present invention.

FIG. 1 shows an exemplary variable-speed wind turbine generator (WT) 1 which is one of a plurality of wind turbine generators of a wind power plant (WPP). It has a rotor 2 with a hub 3 to which, e.g., three blades 4 are mounted. The pitch angle of the rotor blades 4 is variable by means of pitch actuators. The rotor 2 is connected to a nacelle 5 supported by a tower 6 and drives a generator 12 via a main shaft 8, a gearbox 10, and a high speed shaft 11. This structure is exemplary. Other embodiments, for example, use a direct-drive generator.

The generator 12 (e.g. a permanent magnet or synchronous generator) produces electrical output power of a frequency related to the rotation speed of the wind turbine rotor 2, which is converted to grid frequency (e.g. about 50 or 60 Hz) by a converter 19. The voltage of the electric power thus produced is up-transformed by a transformer 9. The output of the transformer 9 is the wind turbine generator's terminals 9a. The electric power from the wind turbine generator 1 and from the other wind turbine generators of the wind power plant is fed into a wind power plant grid 18 (symbolized by "a" in FIG. 1). The internal wind power plant grid 18 is connected at a point of common coupling 21 and an optional further step up transformer 22 to a wind power plant external electrical utility grid 20. The grid 20 is equipped with various regulation capacity against grid fluctuations, e.g. in the form of conventional producers which can increase and lower production on a short-time scale to control voltage and frequency. A control system includes a wind-turbine controller 13 and a power plant controller 23. The power plant controller 23 controls operation of the individual wind turbine generator 1, e.g. selects the full-load or partial-load operation mode, depending i.a. on the current wind speed, causes, in the partial load mode, operation of the wind turbine generator at the optimal working point by adjusting the blade angle and controlling the tip speed ration to the aerodynamic optimum at the current wind speed, and controls the converter 19 to produce electricity according to prescriptions of the power plant controller, e.g. an instruction to provide a certain amount of reactive power in addition to the active power, etc. The power plant controller 23 uses different input signals to perform its control tasks, for example signals representing current wind conditions (e.g. from an anemometer 14 and a wind vane 15 transmitted via line 16), feed-back signals representing pitch angle, rotor position, amplitudes and phases of the voltage and current at the generator 12 and the terminals 9a, etc., and command signals from the power plant controller 23. The power plant controller 23 receives signals representative of the voltage, current and frequency at the point of common coupling 21 (parameters which may be considered to represent the voltage, current and frequency in the utility grid 20) and, optionally, receives information or command signals from the utility-grid provider (at "c" in FIG. 1). Based on some of these (and, optionally, further) input parameters the power plant controller 23 monitors grid stability and, upon detection of a reduction of grid stability, commands the wind-turbine controllers 13 of the wind turbine generator 1 and the other wind turbine generators of the wind power plant 2 (at "b" in FIG. 1) to change operation of the output power supplied.

Parts of the wind turbine controller 13 also control the power electronic converter 19. In an embodiment the power electronic converter 19 has a dedicated converter controller, but still this controller communicates with the wind turbine controller 13. In another embodiment the converter controller is fully embedded in the wind turbine controller 13.

Although the wind turbine generator 1 shown in FIG. 1 is expected to have three blades 4, it should be noted that a wind turbine generator may have different number of blades. It is common to find wind turbine generators having two to four blades. The wind turbine generator 1 shown in FIG. 1 is a Horizontal Axis Wind Turbine (HAWT) as the rotor 2 rotates about a horizontal axis. It should be noted that the rotor 2 may rotate about a vertical axis. Such a wind turbine generators having its rotor rotate about the vertical axis is known as a Vertical Axis Wind Turbine (VAWT). The embodiments described henceforth are not limited to HAWT having 3 blades. They may be implemented in both HAWT and VAWT, and having any number of blades 4 in the rotor 2.

Figure 2A:
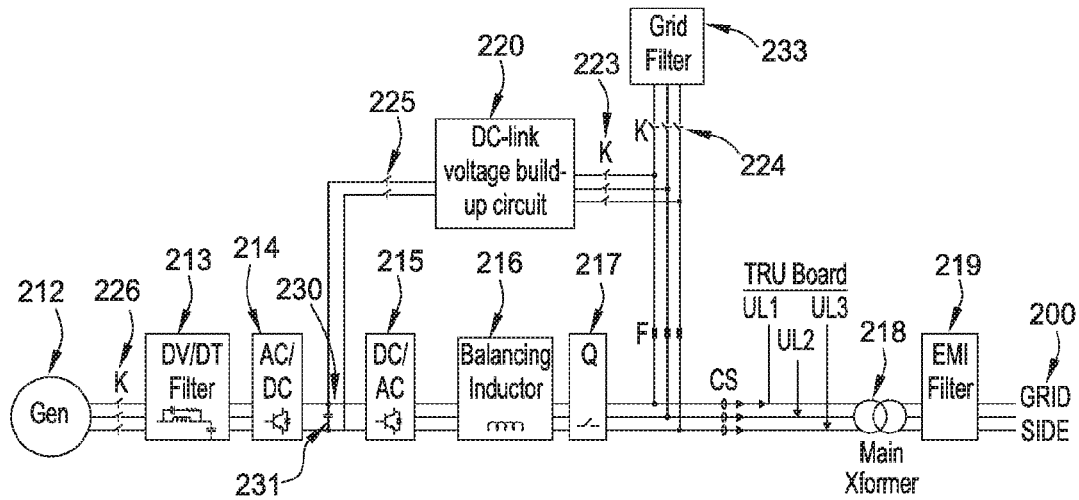
FIG. 2a shows an example of a charging circuit of the DC-link capacitor, known from the prior art.

FIG. 2*a* shows the schematics of the electrical main circuit of the wind turbine generator 1. Starting from left to right, the generator 212, can be any type of electrical generator. The type of generator is with this invention limited to a generator which is excited from the rotor, meaning that an induction generator will not be able to function unless it gets reactive current from the power converter 214, which requires that the power converter 214 is running in an operational mode, and that is not the case as the DC link 230 is not charged, whereas a permanent magnet generator or a field excited synchronous generator can be used. The generator side converter 214 controls the generator 212 and converts the produced alternating current (AC) electrical power to direct current (DC) electrical power and feeds it into the DC link 230. Between the generator 212 and generator side converter 214 is an optional dv/dt filter 213, which is used to limit voltage raise time, and thereby protect the generator windings against partial discharge and other effects of high dv/dt's.

The present type of converter 214, 215 is a voltage source converter, where the DC link 230 consists of one or more capacitors 231. Other types of converters, such as current source converters could also be used; here the DC link would consist of one or more inductors (not shown).

In the DC link 230 a capacitor 231 is shown, as this is just a schematic. The real capacitor 231 would consist of a plurality of capacitors, both connected in parallel and series.

The series connection is used in order to be able to withstand the voltage potential across the DC link terminals. Depending on the AC voltage level, modulation index of the converters 214, 215 and other parameters, the DC voltage level are often in the range of 700 VDC to 1200 VDC, for AC voltage levels of 400 Vac to 700 Vac. The actual calculation of the DC link voltage potential in respect of the parameters mentioned above is known to the skilled person.

The parallel connection is used to increase the capacitance of the DC link, i.e. raise the energy storage, although the word energy storage is used, it is not in general meant as a long term energy, more a short terms energy storage to avoid ripple current in the DC link 230.

The grid side converter 215 inverts the DC link electrical power back into AC electrical at a frequency equal to the frequency at the electrical grid 20. While the generator side converter 214 controls the generator 212, it is the main control task for the grid side control 215 to maintain the DC link voltage level within a safe range during normal operation after the DC link has been pre-charged according to the method of the invention, and thereby ensuring an energy balance in the DC link. Another control task of the grid side converter 215 is to produce reactive power to the grid 200.

The current flow to and from the grid side converter 215 is regulated by the balancing inductor 216, as the impedance over the balancing inductor 216 will cause a current flow, when there is a voltage difference between the input and the output of the inductor. The whole converter/generator branch can be disconnected from the grid via a grid circuit breaker 217.

In addition to the main components already mentioned, there is a transformer 218, to step up the voltage level from the power converter 215 to a grid voltage level at the grid side 200. The output from the transformer is filtered in an optional EMI filter 219. The EMI is not needed for the present invention.

Furthermore, a grid filter 233 is also connected to the low voltage side of the transformer in parallel with the grid side converter 215. The grid filter 233 can be disconnected from the circuit by a circuit breaker 224.

In prior art the DC link 230 was pre-charged with a DC-link voltage build up circuit 220, which could be connected to the grid 200 by switch 223 and connected to the DC link via switch 225. This circuit 220 can be omitted with the present invention.

The present embodiment shows a setup with a single converter string 214, 215. The power rating of the wind turbine generator 1 and chosen converter unit 19, the number of parallel strings can be one or more. Single string converter is shown in this FIG. 2*a* for the sake of clarity.

In an embodiment with several parallel converter units, but with a commonly coupled DC-link, DC-link charge may be performed with only one converter unit 214, or in another embodiment a plurality of converter units 214 is used for charging the DC link.

In an example according to prior art, the converter and generator have only been used to generate power and convert it to fixed frequency power. This means that other components are needed for functions like DC-link charge and the system is also dependent on grid availability. The conventional DC-link charge circuit diagram is presented in FIG. 2*b*.

Figure 2B:
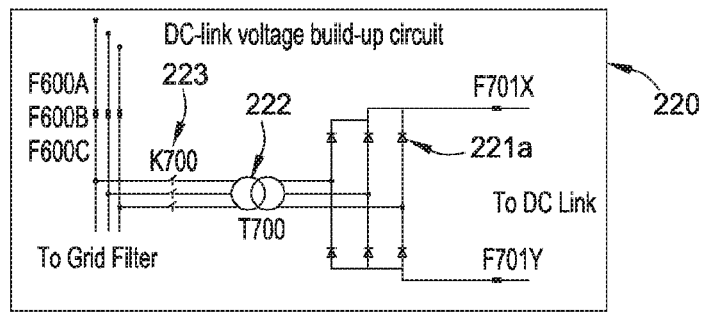
FIG. 2b shows the details of a charging circuit of the DC-link capacitor, known from the prior art.

FIG. 2*b* discloses an embodiment of a DC-link charge circuit according to prior art. The circuit consists of a switch 223, and a transformer 222 to ensure the right voltage level, a rectifier bridge 221 with six diodes 221*a* and additional to fuses F701X and F701Y. A disadvantage of such a circuit is that the capacitor charge current is only limited but the fuses and the transformer, so larger in-rush currents may occur when switch 223 and switch 225 are closed. The same situation with large in-rush currents will also be the case if the freewheeling diodes of the grid converter 215 are used directly in a pre-charge process.

The present invention discloses an approach to use the power converter 214 as DC-link voltage charge units. Generator 212 is exploited as an available energy source and the converter 214 will help to get away with the auxiliary charging circuitry 220. This reduces components in the converter system and thereby enhances reliability.

Wind turbine generator components are often required to be pre-heated to a designated temperature before they can be brought into use for power conversion. In the prior art, power for pre-heating/heating is derived from the grid 20, 200.

An objective of the invention, but not limited to this, is to emphasize on the use of major components in the electrical drive train in tasks beyond what they are designed for. For example, that the generator 212 and converter system 214, 215 can help in pre-heating and also DC-link charge of the turbine, which will exploits the components better.

In wind turbine generators where the electrical generator is a permanent magnet generator, the generator 12, 212 will produce power even if the generator side converter 214 is not in a controlled mode or the control circuit to the converter is turned off. The reason for this is that the generator is always excited with a magnetic field due to the permanent magnets.

Similar effect, as for the permanent magnet generator, may be the case with an excited synchronous generator, depending on the specific excitation circuit used.

In a traditional three phase inverter/converter bridge used in industrial variable frequency drives, known to the skilled person, it is standard that each of the six IGBT's (or any other type of a commutated power electronic switch) has a freewheeling diode connected in parallel with the IGBT. Thus the converters 214, 215 both have passive rectifiers build into their circuits, due to the freewheeling diodes. The same applies to other converter bridges as long as the commutated power electronic switch has a freewheeling diode.

The generator 12, 212 in FIG. 2a will therefore provide power to the DC link 230 through the freewheeling diodes as long as the generator 12, 212 is rotating, i.e. the generator rotor is rotating in respect of the generator stator.

In a wind turbine generator 1 like the embodiment of FIG. 1, the rotor 2 will rotate even at very low wind speed. This means that even when the wind turbine generator 1 is idling small amount of power may be produced. This effect is used in the present invention, as the small amount of power produced during idling can be used for the DC link 230 pre-charge or voltage build-up.

It has been observed that the idling of the rotor 2 in wind turbine generators 1 produces some self-heating in components such as the gearbox 10, due to friction The principle of operation during DC-link pre-charge is that the pre-charge circuit/process must ensure gradual charging of DC-link capacitors 231, in order to avoid damages to the electrical circuit. This can be achieved by the electrical circuit diagrams shown in FIG. 2a, but without the DC-link voltage charge circuit included 220, as the energy to charge the DC link capacitor 231 comes from the generator 212.

Figure 3:
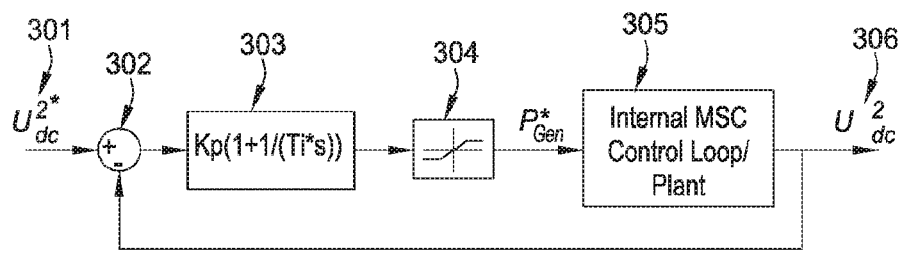
FIG. 3 shows the boost control of the DC link voltage.
Figure 4:
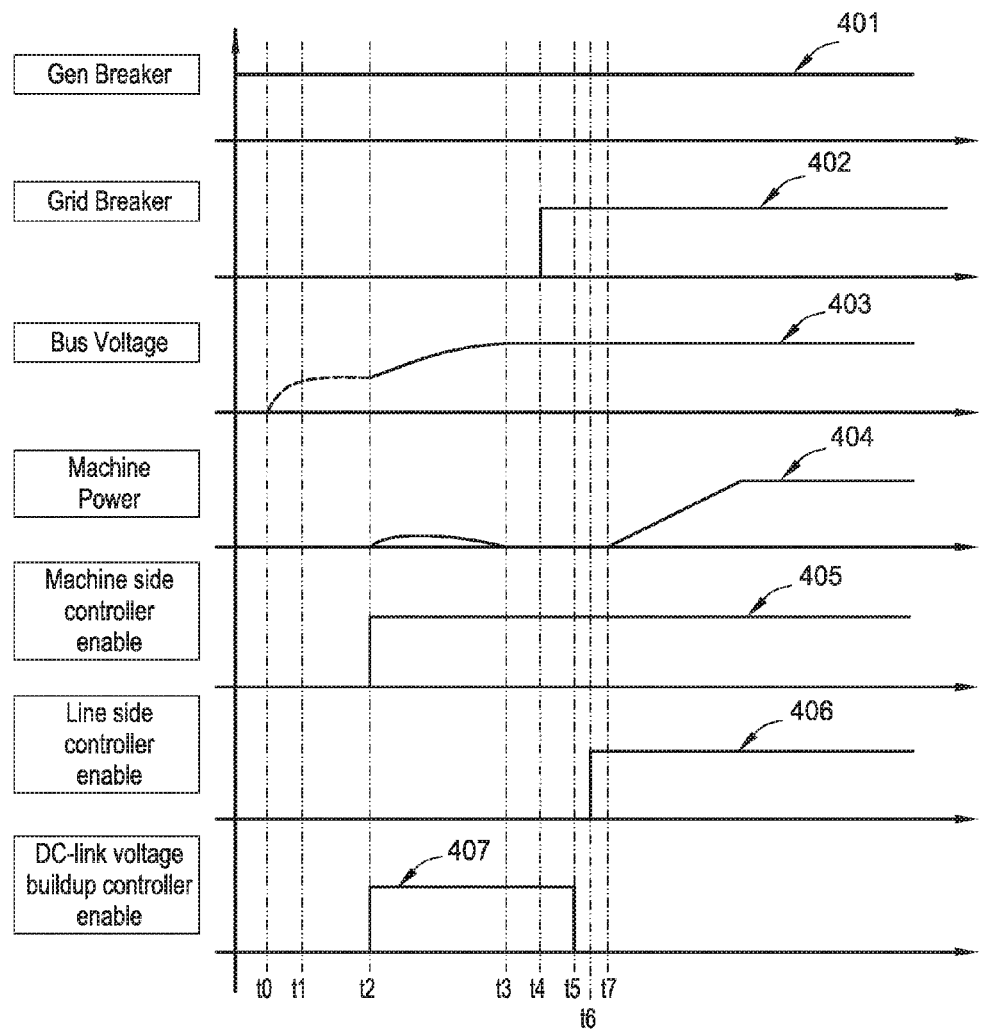

The actual charging is shown in FIG. 4. The DC-link charge controller 407 which is enabled between time interval t2 to t5 is essential to initiate controlled rectification in the boost mode, which is shown in step 3. It is described in the FIG. 3.

Line voltage reference at the generator terminals is derived from the required DC-link voltage. To make the plant a linear first order system 303 the squared DC link voltage 301 is used as the control object. The squared DC link voltage reference 301 is compared to the measured value of the same 306 in a summation block 302.

The voltage controller 303 in FIG. 3 defines the generator side power reference, $P^*_{gen}$. The plant will include the converter and inherited old generator side converter control system 305. The duty cycle of the converter switches is derived from the internal controller 305.

This is given in the control block diagram of FIG. 3. The DC-link build up continues until the current limit set 304 is reached, which concludes the DC link build up.

Two conditions can exist namely:
1) The DC-link voltage after time interval t3 is equal to the threshold
2) The DC-link voltage is still less than the threshold.

If case 1) is true, the pre-charge is completed and the grid side converter 215 can be started for normal operation, after grid circuit breaker 217 is closed.

If case 2) is true, the grid side converter 215 will be used to regulate the voltage. There will not be a possibility of current surges as the link voltage has sufficiently high value.

Depending on the rotor speed of the generator 212 the line to line voltage level may be so high that the charging of the DC link voltage can reach the threshold without having to control the generator side converter in boost mode.

Several process steps may be needed for DC-link charge, as shown in FIG. 4, where all steps are covered.

The x-axis of all the subfigures represents time, and the steps of the process are divided into different time intervals t0, t1, t2, t3, t4, t5, t6 and t7.

The generator side circuit breaker 226 is normally closed before spinning up the turbine rotor 2. This ensures zero voltage difference between source and the DC link capacitors 231. As soon as the generator side circuit breaker 226 is closed power can flow to the DC link capacitors 231, if the generator is rotating. Gen breaker Trace 401 in FIG. 4 shows that the signal is high and thus the generator side circuit breaker 226 is closed.

At the time interval t0-t1: At certain time t0 the rotor 2 starts from zero speed, and the DC-link 230 receives charging current that rises from zero onwards, see trace 403. This stage is in an uncontrolled naturally charging stage, and the charging current then goes to zero by itself. At zero current, the generator is like an open circuit.

In an embodiment, various processes can be carried out during this period of time, such as the encoder calibration and control initialization.

The next time interval is t1-t2: After the rotor 2 reaches the highest rotational speed the DC-link voltage will stay at value roughly equal to the line to line voltage of the generator terminals times the sqrt(2).

$$\sqrt{2} V_{LL-GEN}$$

The level can also be described as the passive rectifier threshold level, as this is the highest voltage that can be reached without having to actively control the generator side converter 214.

During this period the DC link voltage may change as a function of the wind speed, as the generator voltage is a function of the rotational speed of the generator rotor.

Next time interval t2-t3: At t2 to t3 the DC-link voltage build-up controller (FIG. 3) is enabled (see trace 407) and the generator side converter 214 is regulated (see trace 405) as a boost rectifier and it keeps building up the DC-link voltage. The generator 212 produces a little amount of power (see trace 404)

Next time interval t3-t4: At t3 the DC-link voltage reaches the desired value but the charging controller is still enabled to maintain the bus voltage, trace 403 has reached a maximum, and stays constant.

Next time interval t4-t5: The grid circuit breaker 217 is closed at t4 when the DC link voltage has reached a threshold value. Trace 402 shows when the grid circuit breaker 217 is closed.

Next time interval t5-t6: The DC-link voltage is normally controlled by grid side converter 215. And hence after closing the grid circuit breaker 217, the DC-link voltage build-up controller (FIG. 3) is disabled and grid side controller is enabled 406. The DC link is now controlled by the grid side converter 215.

Next time interval t6-t7: The system are waiting for the generator 212 to generate power to the grid 200.

The wind turbine generator is now ready to ramp-up power and the normal operation method is resumed. The power is ramped up 404, while the rotor 2 harvests more and more power as the pitch angle of the rotor 2 changes.

A MATLAB simulation is performed for verification and also carried out following the analyzed time sequence as strictly as can do it.

Figure 5:
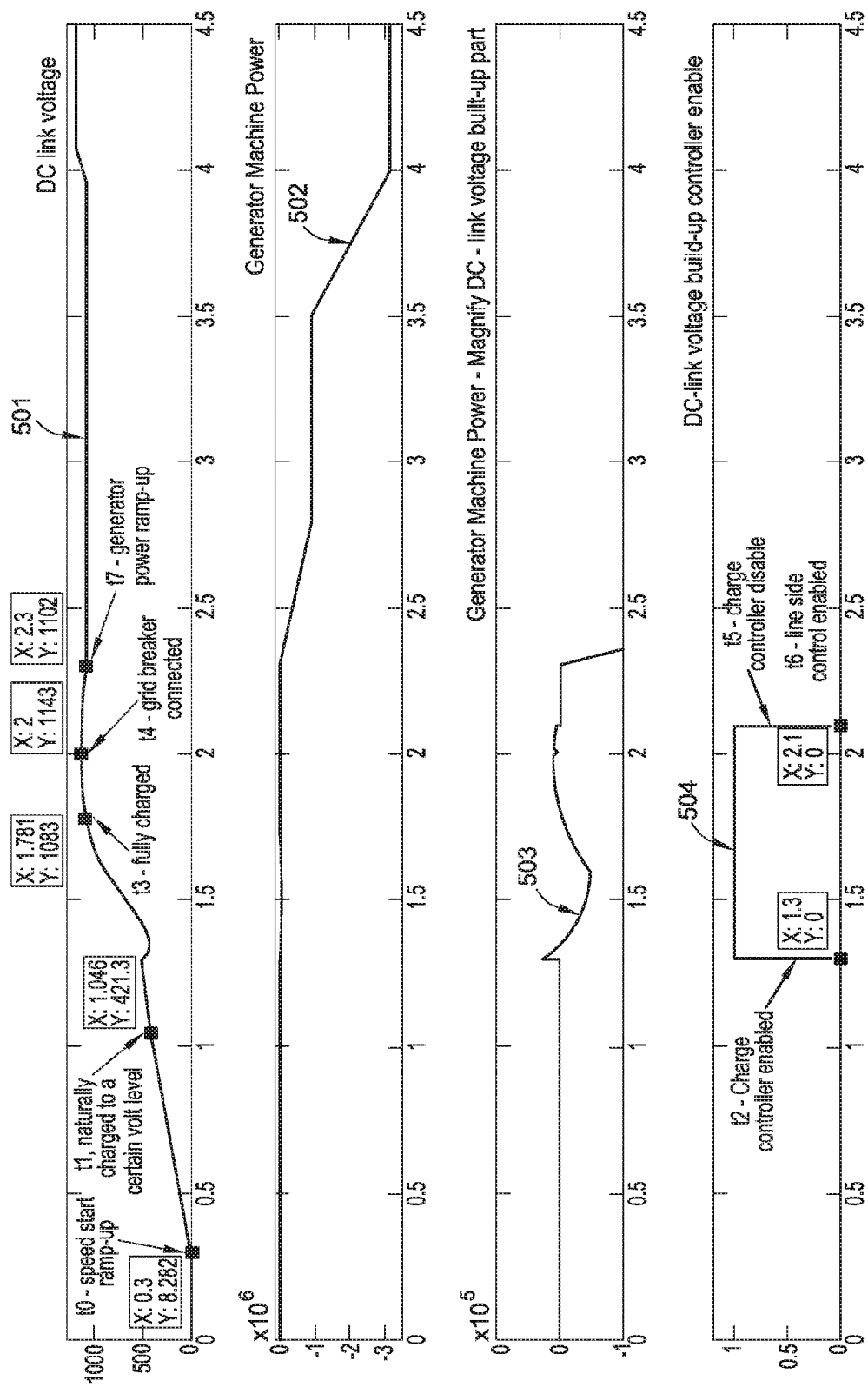
FIG. 5 simulation Vdc and power waveform and time sequence.
Figure 6:
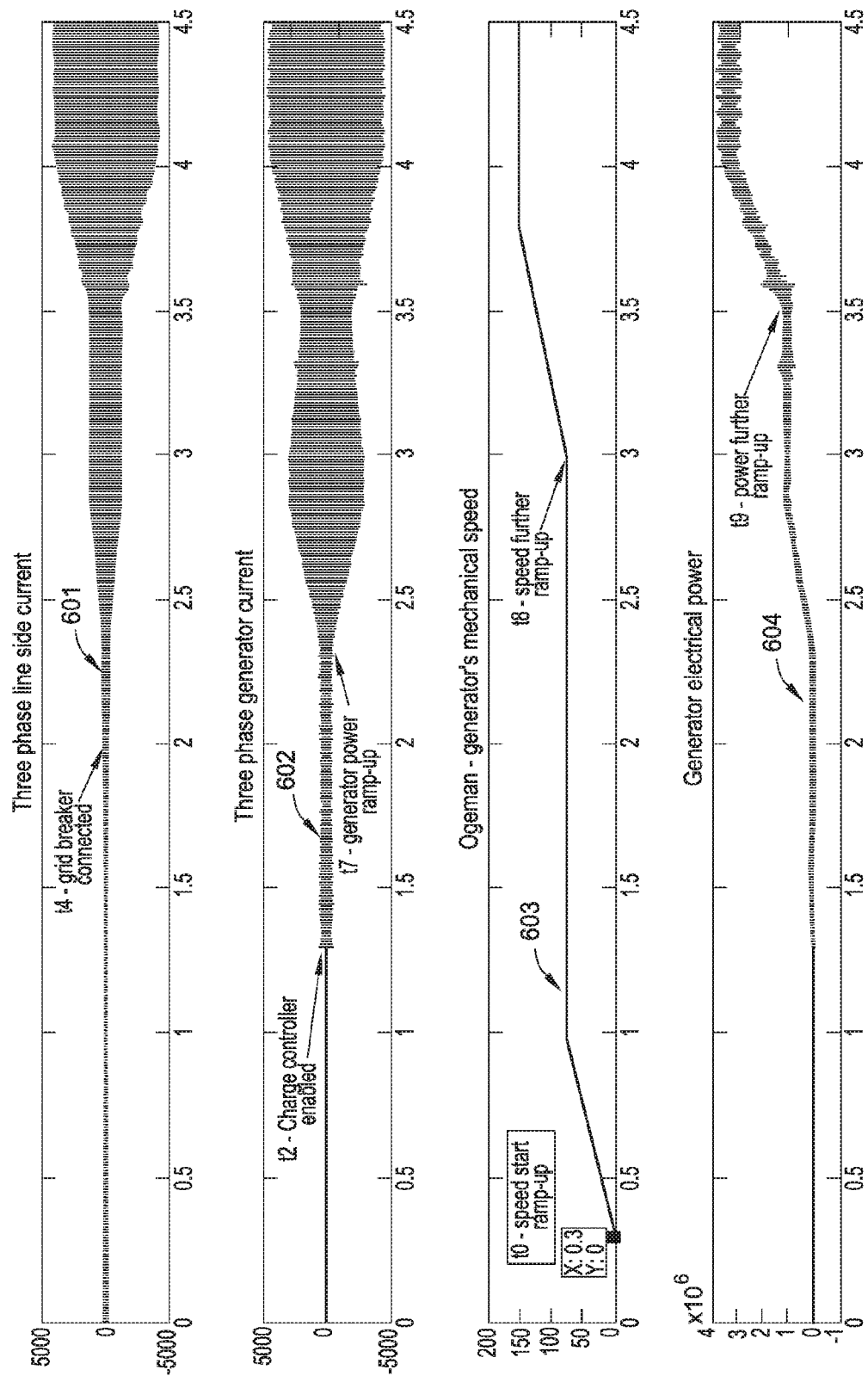
FIG. 6 simulation current, generator speed and power waveform and time sequence.

The simulation results are shown in FIG. 5 and FIG. 6.

A few comments to the simulations compared to the sequence shown in FIG. 4.

t0 to t7 are corresponding to the one analyzed in FIG. 4, the time intervals are shown in the upper FIG. 5 DC link voltage 501;

t5 and t6 are overlapped because the simulation restriction;

t8 (see FIG. 6, 603) and further added to ramp up speed and power generation to nominal value;

The simulation waveforms in FIG. 5 and FIG. 6 show that the charging sequence is nearly the same as the one analyzed in FIG. 4. Thus the concept is workable theoretically. Where 501 is the DC link voltage in the simulation, 502 shows the generator machine power, 503 is magnified part of 502 which shows the DC link voltage build-up/charging. Last picture in FIG. 5 shows when the DC link build up controller signal 504 is enabled.

The different parts of FIG. 6 show the following: The line side current 601 is in the upper picture, of special interest is the time around 2 sec i.e. t4 where the grid circuit breaker 217 connects. The generator current 602 shows at t2 that some current is drawn from the generator for charging the DC link 230, this happens at the same time as the DC link build up controller signal 504 goes high. The mechanical rotor speed of the rotor 2 is trace 603 and the actual generator power is 604.

In many wind turbine generators there are a requirement to pre-heat the turbine components before turbine start-up and the charging method of the present invention actually functions to enable this. In a 2 MW wind turbine generator an estimate of more than 50 kW of power is needed in order to maintain the wind turbine preheated. This reduces the dependence on the grid 20, 200 for pre-generation requirements, as part of the pre-heat power can be provided by the permanent magnet generator. In an embodiment, the generator 212 provides power to the pre-heat before going into full power production.

If the wind turbine generator 1 is disconnected completely from the electrical grid 20, 200, and no other electrical power source is available, there is no power or hydraulic pressure to actuate the pitch actuators or electrical power for the yaw motor. When the wind direction is in a favorable direction seen from the individual wind turbine generator, the generator-converter combination can start the turbine even during the absence of grid. Such conditions may arise when the grid 20, 200 is recovering from a fault. Starting the wind turbine generator 1 without the grid 20, 200 being present, is in the power plant literature called a "black start", as the power generator has to start without electrical power available for auxiliary services.

Figure 7:
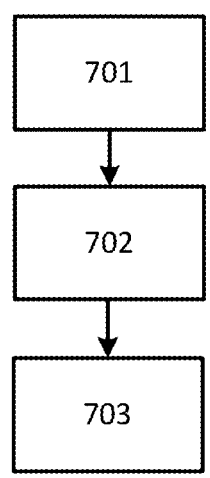
FIG. 7 shows a flow chart of the method according to an aspect of the invention.

FIG. 7 shows a flow chart of method according to an aspect of the invention for charging a DC link of a power converter in a wind turbine generator. Step 701 is rotating the wind turbine rotor whereby the electrical generator generates electrical power. Step 702 is rectifying the electrical power through at least one diode in the generator side converter and thereby pre-charging the DC link to a DC voltage level. Finally, step 703 is closing the grid circuit breaker when the DC voltage level is greater than a threshold level.

In summary the invention relates to a method for charging a DC link of a power converter in a wind turbine generator, the wind turbine generator comprising a generator side converter connected to an electrical generator and a grid side converter connected, or connectable, to an electrical grid through a grid circuit breaker, and a converter controller arranged for controlling at least the DC link, the DC link having a DC voltage level. The wind turbine generator comprises a wind turbine rotor arranged for rotating the generator, wherein the method comprises: rotating the wind turbine rotor whereby the electrical generator generates electrical power, rectifying the electrical power through at least one diode in the generator side converter and thereby pre-charging the DC link to a DC voltage level, closing the grid circuit breaker when the DC voltage level is greater than a threshold level. The invention also relates to a wind turbine generator with a converter controller for controlling pre-charging of a DC link.

The DC link being between the generator side converter and the grid side converter may imply that the DC link is connected to the generator side converter and the grid side converter.

The individual elements of an embodiment of the invention may be physically, functionally and logically implemented in any suitable way such as in a single unit, in a plurality of units or as part of separate functional units. The invention may be implemented in a single unit, or be both physically and functionally distributed between different units and processors.

Although the present invention has been described in connection with the specified embodiments, it should not be construed as being in any way limited to the presented examples. The scope of the present invention is to be interpreted in the light of the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Further, individual features mentioned in different claims, may possibly be advantageously combined, and the mentioning of these features in different claims does not exclude that a combination of features is not possible and advantageous.

The invention claimed is:

1. A method for charging a DC link in a wind turbine generator, the wind turbine generator comprising:
   a generator side converter connected to an electrical generator,
   a grid side converter connected to an electrical grid through a grid circuit breaker, wherein the grid side converter is coupled to the generator side converter via the DC link, and
   a converter controller arranged to control at least the DC link, the DC link having a DC voltage level, the wind turbine generator comprising a wind turbine rotor arranged to rotate the electrical generator,
   wherein the method comprises:
      rotating the wind turbine rotor whereby the electrical generator generates electrical power;
      rectifying the electrical power through at least one diode of the generator side converter in order to pre-charge the DC link to a first voltage threshold without actively controlling the generator side converter;
      rectifying the electrical power through the generator side converter in order to pre-charge the DC link from the first voltage threshold to a second voltage threshold by actively controlling the generator side converter; and
      closing the grid circuit breaker when the DC voltage level on the DC link is greater than or equal to the second voltage threshold.

2. The method according to claim 1, wherein the method further comprises:

controlling the generator side converter in a boost control mode by actively controlling the generator side converter, when the DC voltage level is greater than a passive rectifier threshold level corresponding to the first voltage threshold, to reach the second voltage threshold.

3. The method according to claim 1, wherein the method further comprises:
controlling the grid side converter, after the grid circuit breaker is closed, so that the DC voltage level is within an operational range.

4. The method according to claim 1, wherein the wind turbine rotor comprises at least one actuator for changing a pitch angle of a blade, the method further comprising:
adjusting the at least one actuator in order to change the blade pitch angle for controlling the electrical power.

5. The method according to claim 1, wherein the generator is a permanent magnet type of generator, or a synchronous generator.

6. The method according to claim 1, wherein the method further comprises:
starting the wind turbine generator after a grid fault.

7. A wind turbine generator comprising:
a power converter comprising a generator side converter connected to an electrical generator and a grid side converter connectable to an electrical grid through a grid circuit breaker, and a DC link between the generator side converter and the grid side converter, the DC link having a DC voltage level;
a wind turbine rotor mechanically connected to the electrical generator; and
a converter controller configured to:
enable the wind turbine rotor to rotate, whereby power is produced by the electrical generator and rectified through at least one diode of the generator side converter in order to pre-charge the DC link, wherein pre-charging the DC link comprises:
increasing the DC voltage level to a first voltage threshold without the generator side converter being actively controlled, and
actively controlling the generator side converter to increase the DC voltage level from the first voltage threshold to a second voltage threshold.

8. The wind turbine generator according to claim 7 wherein the electrical generator is a permanent magnet type of generator or a synchronous generator.

9. The wind turbine generator according to claim 7, wherein the converter controller is configured to:
control the generator side converter in a boost control mode by actively controlling the generator side converter, when the DC voltage level of the DC link is greater than a passive rectifier threshold level corresponding to the first voltage threshold, to reach the second voltage threshold.

10. The wind turbine generator according to claim 7, wherein the converter controller is configured to:

close the grid circuit breaker when the DC voltage level on the DC link is greater than or equal to the second voltage threshold.

11. The wind turbine generator according to claim 10, wherein the converter controller is configured to:
control the grid side converter, after the grid circuit breaker is closed, so that the DC voltage level is within an operational range.

12. The wind turbine generator according to claim 7, wherein the converter controller is configured to:
pre-charge the DC link after a grid fault.

13. A system comprising:
an electrical generator;
a power converter comprising a generator side converter connected to the electrical generator and a grid side converter connectable to an electrical grid through a grid circuit breaker, and a DC link between the generator side converter and the grid side converter, the DC link having a DC voltage level;
a wind turbine rotor mechanically connected to the electrical generator; and
a controller configured to:
enable the wind turbine rotor to rotate, whereby power is produced by the electrical generator and rectified through at least one diode of the generator side converter in order to pre-charge the DC link, wherein pre-charging the DC link comprises:
increasing the DC voltage level to a first voltage threshold without the generator side converter being actively controlled, and
actively controlling the generator side converter to increase the DC voltage level from the first voltage threshold to a second voltage threshold.

14. The system according to claim 13 wherein the electrical generator is a permanent magnet type of generator or a synchronous generator.

15. The system according to claim 13, wherein the controller is configured to:
control the generator side converter in a boost control mode by actively controlling the generator side converter, when the DC voltage level of the DC link is greater than a passive rectifier threshold level corresponding to the first voltage threshold, to reach the second voltage threshold.

16. The system according to claim 13, wherein the controller is configured to:
close the grid circuit breaker when the DC voltage level on the DC link is greater than or equal to the second voltage threshold.

17. The system according to claim 16, wherein the controller is configured to:
control the grid side converter, after the grid circuit breaker is closed, so that the DC voltage level is within an operational range.

18. The system according to claim 13, wherein the controller is configured to:
pre-charge the DC link after a grid fault.

* * * * *